US008852771B2

United States Patent
Kusama et al.

(10) Patent No.: US 8,852,771 B2
(45) Date of Patent: Oct. 7, 2014

(54) BATTERY

(75) Inventors: Kazuyuki Kusama, Nagoya (JP); Tomohiro Matsuura, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/376,930

(22) PCT Filed: Jul. 8, 2010

(86) PCT No.: PCT/JP2010/061597
§ 371 (c)(1),
(2), (4) Date: Dec. 8, 2011

(87) PCT Pub. No.: WO2011/077775
PCT Pub. Date: Jun. 30, 2011

(65) Prior Publication Data
US 2012/0251854 A1 Oct. 4, 2012

(30) Foreign Application Priority Data
Dec. 25, 2009 (JP) ................................. 2009-294134

(51) Int. Cl.
| H01M 10/02 | (2006.01) |
| H01M 2/30 | (2006.01) |
| H01M 2/04 | (2006.01) |
| H01M 10/52 | (2006.01) |
| H01M 4/70 | (2006.01) |
| H01M 10/04 | (2006.01) |
| H01M 10/052 | (2010.01) |
| H01M 2/26 | (2006.01) |
| H01M 2/12 | (2006.01) |

(52) U.S. Cl.
CPC .......... H01M 10/0431 (2013.01); Y02E 60/122 (2013.01); H01M 10/052 (2013.01); H01M 2/263 (2013.01); H01M 2/1229 (2013.01); H01M 10/587 (2013.01)
USPC ......................................................... 429/62

(58) Field of Classification Search
None
See application file for complete search history.

(56) References Cited

U.S. PATENT DOCUMENTS

| 5,523,178 | A | * | 6/1996 | Murakami et al. ............. 429/53 |
| 6,811,920 | B2 | * | 11/2004 | Murashige et al. ............ 429/94 |
| 7,175,936 | B2 | * | 2/2007 | Kawamura et al. ............ 429/94 |
| 2003/0198863 | A1 | | 10/2003 | Murashige et al. |
| 2009/0280403 | A1 | * | 11/2009 | Han et al. ...................... 429/164 |
| 2010/0287763 | A1 | | 11/2010 | Tsuchiya et al. |

FOREIGN PATENT DOCUMENTS

| JP | 2000-3701 | | 1/2000 |
| JP | 2000-228182 | * | 8/2000 |

(Continued)

OTHER PUBLICATIONS

International Search Report in International Application No. PCT/JP2010/061597; Mailing Date: Oct. 19, 2010.

*Primary Examiner* — Patrick Ryan
*Assistant Examiner* — Christopher Domone
(74) *Attorney, Agent, or Firm* — Finnegan, Henderson, Farabow, Garrett & Dunner, LLP

(57) ABSTRACT

A battery includes a cylindrical shaft core, and a wound electrode formed by winding a first electrode plate, a second electrode plate, and a separator around the outer periphery of the core. The wound electrode has a first wound portion formed by winding a first active material uncoated portion of the first electrode plate, a second wound portion formed by winding a second active material uncoated portion of the second electrode plate, and a power generating portion positioned between the first and second wound portions and formed by winding the first and second electrode plates, and the separator. The shaft core has a current collector portion composed of a metal, which is comprised of a joint portion connected to the first or second wound portion. The portions of the first or second wound portion, which are positioned on the outside of the shaft core in the radial direction with respect to the joint portion, are overlapped and welded to the joint portion.

2 Claims, 14 Drawing Sheets

(56) References Cited

FOREIGN PATENT DOCUMENTS

| JP | 2000-268803 | 9/2000 |
| JP | 2001-357887 | 12/2001 |
| JP | 2002-134095 | 5/2002 |
| JP | 2002-222666 | 8/2002 |
| JP | 2003-317805 | 11/2003 |
| JP | 2009-176482 | 8/2009 |
| JP | 2009-181812 | 8/2009 |

\* cited by examiner

BATTERY

CROSS-REFERENCE TO RELATED APPLICATIONS

This application is a national phase application of International Application No. PCT/JP2010/061597, filed Jul. 8, 2010, and claims the priority of Japanese Application No. 2009-294134, filed Dec. 25, 2009, the contents of both of which are incorporated herein by reference.

TECHNICAL FIELD

The present invention relates to a battery.

BACKGROUND ART

Batteries having a wound electrode assembly have been proposed in recent years as high energy density batteries (see, for example, Patent Document 1).

RELATED ART DOCUMENTS

Patent Documents

Patent Document 1: JP2002-134095A

The battery of Patent Document 1 includes a cylindrical shaft core (winding core) having a bore extending in an axial direction, and a wound electrode assembly (assembly of wound electrodes) formed by winding a positive electrode plate, a negative electrode plate, and separators around the outer circumference of the shaft core. In this battery, the positive electrode plate of the wound electrode assembly is electrically connected to a positive current collector plate via a lead tab. Similarly, the negative electrode plate of the wound electrode assembly is also electrically connected to a negative current collector plate via a lead tab.

DISCLOSURE OF THE INVENTION

Problems to be Solved by the Invention

However, with the current collecting structure in which an electrode plate (positive or negative electrode plate) of a wound electrode assembly is electrically connected to a current collector portion (positive or negative current collector plate) via a lead tab, electrical resistance between the electrode plate and the current collector portion is high. Therefore, a current collecting structure that can reduce electrical resistance between an electrode plate and a current collector portion has been sought after.

The present invention was devised in view of such circumstances and its object is to provide a battery with reduced electrical resistance between electrode plates and current collector portions.

Means of Solving the Problems

One aspect of the present invention is a battery including: a cylindrical shaft core having a bore extending in an axial direction; and a wound electrode assembly formed by winding a first electrode plate, a second electrode plate, and separators around an outer circumference of the cylindrical shaft core, the wound electrode assembly including: a first wound portion formed by a wound first active material-uncoated portion of the first electrode plate, the first wound portion constituting a distal end of the wound electrode assembly in the axial direction, a second wound portion formed by a wound second active material-uncoated portion of the second electrode plate, the second wound portion constituting a rear end of the wound electrode assembly in the axial direction, and a power generating portion located between the first wound portion and the second wound portion in the axial direction and formed by the first electrode plate, the second electrode plate, and the separators wound together, wherein the shaft core includes a metal current collector portion having a current collector joint portion to be joined with the first wound portion or the second wound portion, wherein portions of the first wound portion or the second wound portion located on a radially outer side of the shaft core relative to the current collector joint portion are overlapped and welded to the current collector joint portion, wherein the battery includes: a cylindrical case body with a bottom for accommodating the wound electrode assembly, a lid member closing an opening of the case body and having an insertion hole, into which a protruding portion of the shaft core around which the wound electrode assembly is wound, protruding from the wound electrode assembly toward a distal end in the axial direction, is inserted, and a safety vent closing a distal end opening of the protruding portion, the safety vent being capable of opening when internal pressure of the battery reaches a predetermined vent-opening pressure to discharge gas introduced into the bore of the shaft core inside the battery through the bore from the safety vent to the outside of the battery, wherein the protruding portion of the shaft core includes a through hole extending through the wall forming the protruding portion at a position further on the rear end side in the axial direction than the lid member, or, a cut-out formed by cutting off part of the wall forming the protruding portion from a distal end of itself to a position further on the rear end side in the axial direction than the lid member.

In the battery described above, the shaft core includes a metal current collector portion having a current collector joint portion to be joined with the first wound portion or the second wound portion. Portions of the first wound portion or the second wound portion located on a radially outer side of the shaft core relative to the current collector joint portion are overlapped and welded to the current collector joint portion. In other words, portions of the first wound portion or the second wound portion located on the radially outer side of the shaft core relative to the current collector joint portion are welded to the current collector joint portion in an overlapped state.

Welding the first electrode plate or the second electrode plate (more particularly, the first wound portion or the second wound portion) to the current collector portion directly and not via a lead wire in this way can reduce electrical resistance between the electrode plate (first electrode plate or second electrode plate) and the current collector portion.

Furthermore, in the battery described above, portions of the first wound portion or the second wound portion located on the radially outer side of the shaft core relative to the current collector joint portion (portions welded to the current collector joint portion) are overlapped, so that the current collecting path between the electrode plate (first electrode plate or second electrode plate) and the current collector portion is made short and at the same time increased (by the winding number of the first wound portion or the second wound portion). Thereby, the electrical resistance between the electrode plate (first electrode plate or second electrode plate) and the current collector portion can be reduced further.

As compared to conventional batteries (for example the battery of Patent Document 1), the battery described above does not use a lead wire for the electrical connection between the electrode plate (first electrode plate or second electrode plate) and the current collector portion, so that the number of components can be reduced accordingly. Moreover, since the shaft core includes the current collector portion (the current collector portion being part or all of the shaft core) in the battery described above, the number of components can be reduced as compared to conventional batteries (for example the battery of Patent Document 1) in which the shaft core and the current collector portion (current collector plate) are separate components.

The battery described above includes a safety vent closing a distal end opening (opening at the distal end in the axial direction) of the protruding portion of the shaft core (portion of the shaft core protruding from the wound electrode assembly toward the distal end side in the axial direction). This safety vent opens when internal pressure of the battery reaches a predetermined vent-opening pressure to discharge gas introduced into the bore of the shaft core inside the battery through the bore of the shaft core from the safety vent to the outside of the battery.

Incidentally, conventional batteries (for example the battery of Patent Document 1) include a safety vent that opens (breaks open) when internal pressure of the battery reaches a predetermined level (vent-opening pressure) to discharge gas inside the battery to the outside. More particularly, in the battery of Patent Document 1, gas released from the lower end (rear end in the axial direction) of the wound electrode assembly to the outside thereof is introduced into the bore (hollow part) of the shaft core from the lower end (rear end in the axial direction) of the shaft core and discharged through the bore of the shaft core from the open safety vent to the outside of the battery.

However, in the battery with such a structure, gas released from the upper end (distal end in the axial direction) of the wound electrode assembly to the outside thereof could not be introduced into the bore (hollow part) of the shaft core, nor could it be discharged from the open safety vent to the outside of the battery. For this reason, there was a risk of an excessive build-up of pressure even after the safety vent has opened because of the inability to lower the pressure in the space at the upper end (distal end in the axial direction) of the wound electrode assembly inside the battery.

In this respect, in the battery described above, the protruding portion of the shaft core (portion of the shaft core protruding from the wound electrode assembly to the distal end side in the axial direction) has a through hole extending through the wall forming the protruding portion at a location further on the rear end side in the axial direction than the lid member (closer to the wound electrode assembly). Alternatively, the protruding portion of the shaft core has a cut-out formed by cutting off part of the wall forming the protruding portion from a distal end of itself (distal end in the axial direction) to a position further on the rear end side in the axial direction than the lid member (closer to the wound electrode assembly). Thereby, gas released from the distal end in the axial direction of the wound electrode assembly to the outside thereof can be introduced into the bore of the shaft core either through the through hole or the cut-out. Thereby, the gas released from the distal end in the axial direction of the wound electrode assembly to the outside thereof can be discharged appropriately through the bore of the shaft core from the open safety vent to the outside of the battery.

Note that the first active material-uncoated portion of the first electrode plate represents a portion consisting only of a first current collector foil (for example, aluminum foil) that forms the first electrode plate and not including a first mixture layer containing a first active material (for example, lithium nickel oxide). Also, the second active material-uncoated portion of the second electrode plate represents a portion consisting only of a second current collector foil (for example, copper foil) that forms the second electrode plate and not including a second mixture layer containing a second active material (for example, graphite).

Furthermore, in the battery described above, the current collector joint portion should preferably have a flat shape.

In the battery described above, the current collector joint portion has a flat shape. Therefore, when the portions of the first wound portion or the second wound portion located on the radially outer side of the shaft core relative to the current collector joint portion (hereinafter also referred to as wound welded portions) are overlapped and welded to the current collector joint portion, they (wound welded portions and current collector joint portion) can be appropriately welded (joined) together. More specifically, when the wound welded portions are welded to the current collector joint portion by ultrasonic welding or resistance welding and the like, they can be pressed together appropriately (sufficiently), as the flat-shaped current collector joint portion can make better pressure contact with the wound welded portions than a circular current collector joint portion, whereby they can be welded together appropriately (sufficiently).

In this respect, in the battery described above, the protruding portion of the shaft core (portion of the shaft core protruding from the wound electrode assembly to the distal end side in the axial direction) has a through hole extending through the wall forming the protruding portion at a location further on the rear end side in the axial direction than the lid member (closer to the wound electrode assembly). Alternatively, the protruding portion of the shaft core has a cut-out formed by cutting off part of the wall forming the protruding portion from a distal end of itself (distal end in the axial direction) to a position further on the rear end side in the axial direction than the lid member (closer to the wound electrode assembly). Thereby, gas released from the distal end in the axial direction of the wound electrode assembly to the outside thereof can be introduced into the bore of the shaft core either through the through hole or the cut-out. Thereby, the gas released from the distal end in the axial direction of the wound electrode assembly to the outside thereof can be discharged appropriately through the bore of the shaft core from the open safety vent to the outside of the battery.

MODE FOR CARRYING OUT THE INVENTION

Example 1

Figure 1:
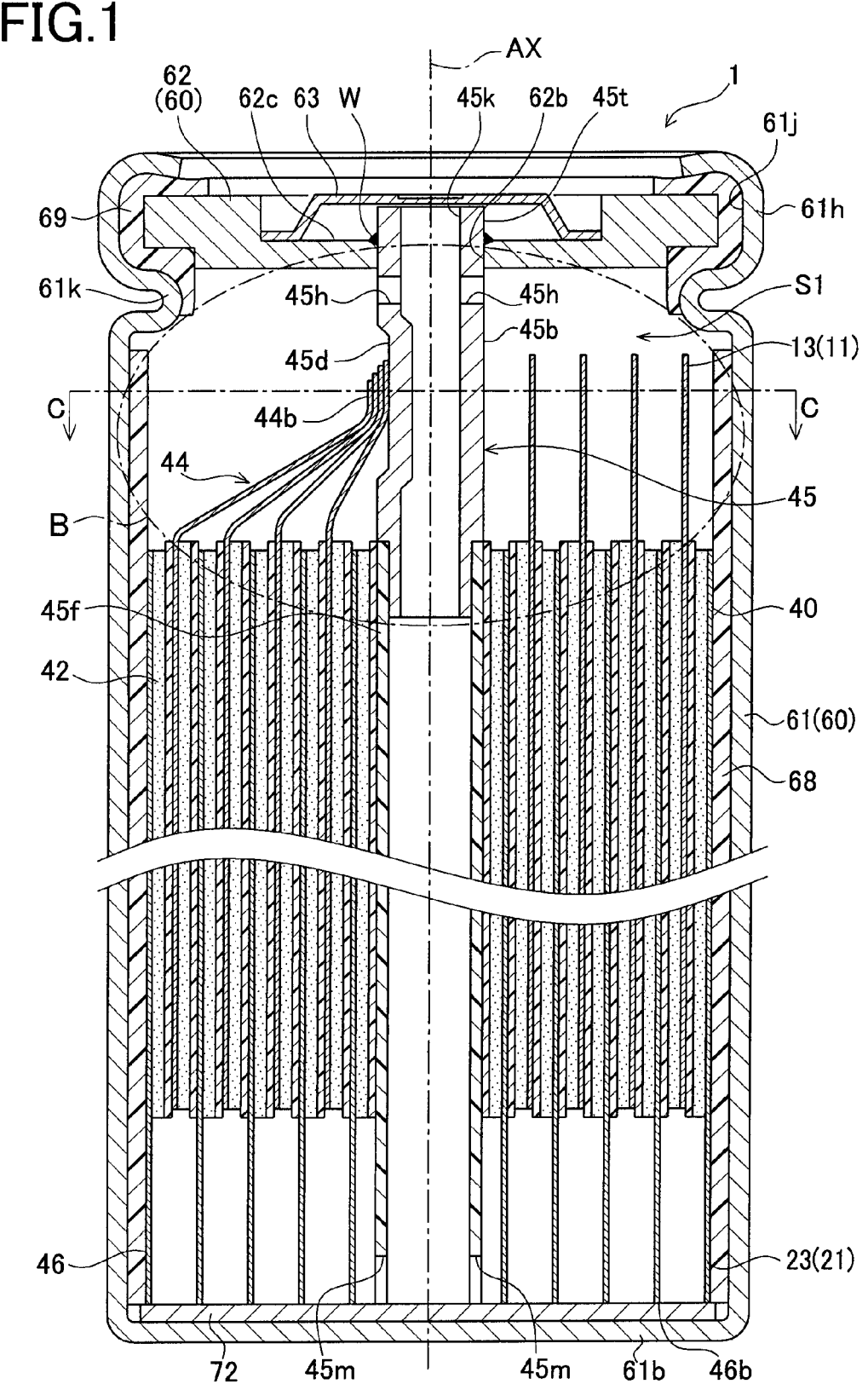
FIG. 1 is a longitudinal cross-sectional view of a battery of Example 1.

FIG. 1 is a longitudinal cross-sectional view (cross-sectional view cut along the axis line AX) of a battery 1 according to Example 1. The battery 1 of Example 1 is a cylindrical battery (see FIG. 1). This battery 1 includes a wound electrode assembly 40 and a battery case 60 accommodating this wound electrode assembly 40. Of these, the wound electrode assembly 40 is a cylindrical wound electrode assembly, formed by a first electrode plate 10 (positive electrode plate), a second electrode plate 20 (negative electrode plate), and separators 30 wound around the outer circumference of a shaft core 45.

The wound electrode assembly 40 is actually a wound electrode assembly with 50 turns (winding turns) (a wound electrode assembly formed by winding a laminated assembly of the first electrode plate 10, second electrode plate 20, and separators 30 around the shaft core 45 fifty times), but FIG. 1 and others show the wound electrode assembly 40 with a reduced number of turns (reduced to 5 turns). An insulating sheet 68 made of an electrical insulating resin is disposed between the outer circumferential surface of the wound electrode assembly 40 and the inner circumferential surface of the battery case 60 (case body 61).

Figure 2:
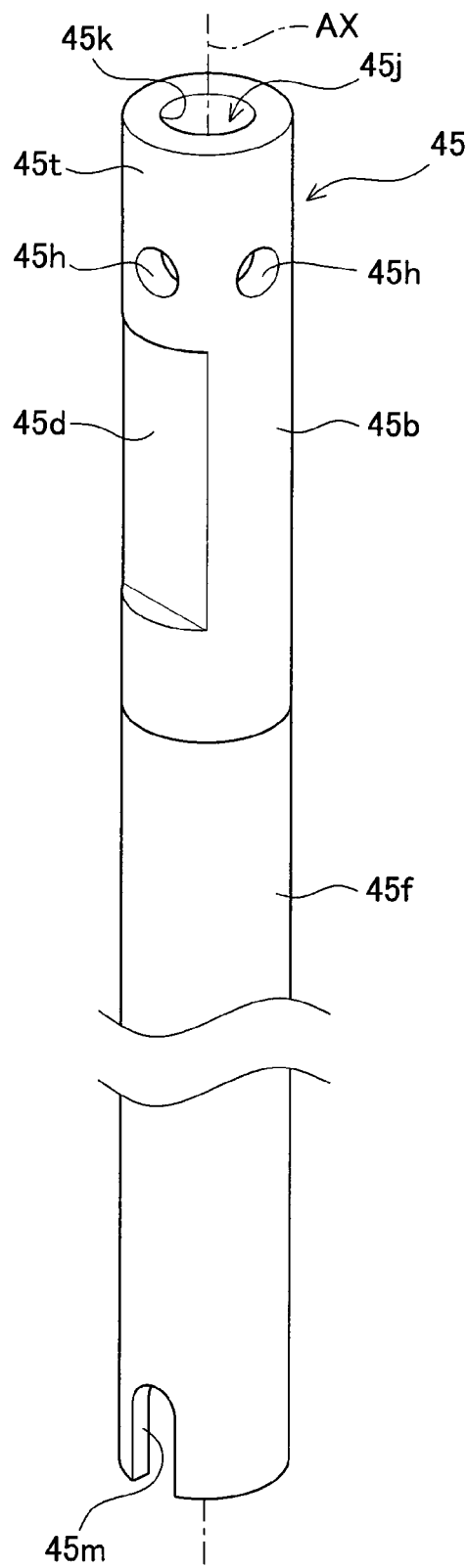
FIG. 2 is a perspective view of a shaft core of Example 1.
Figure 3:
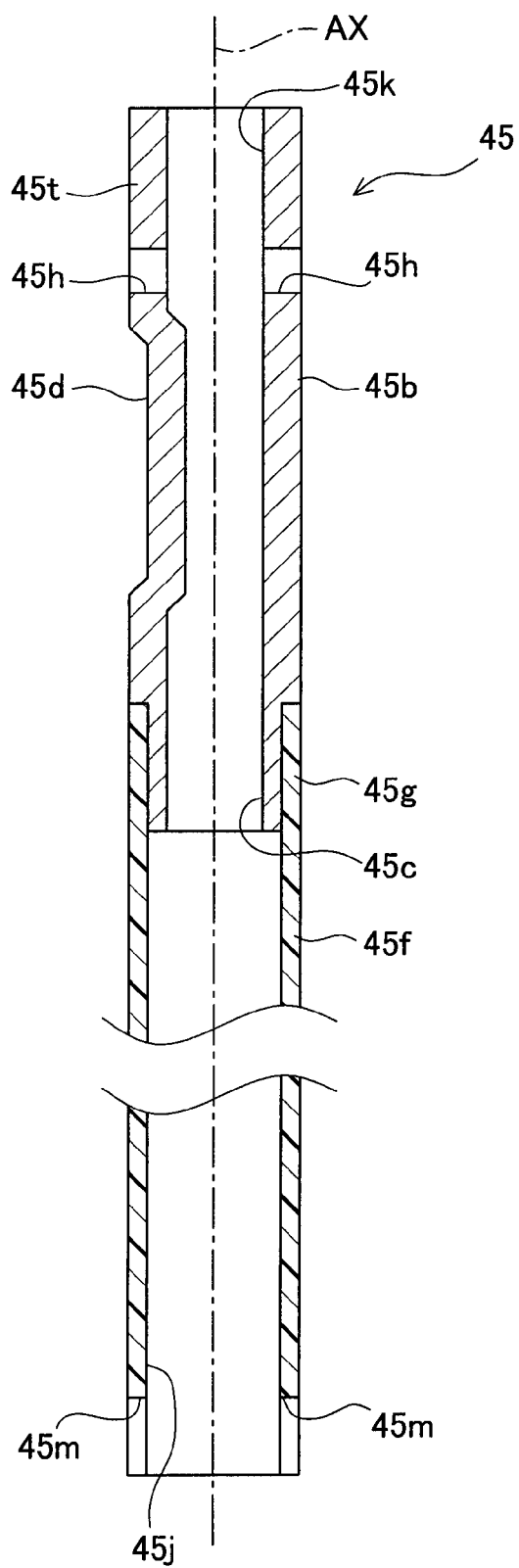
FIG. 3 is a longitudinal cross-sectional view of the shaft core of Example 1.

As shown in FIGS. 2 and 3, the shaft core 45 is cylindrical and has a bore 45*j* extending in the axial direction (in which the axis line AX extends, up and down direction in FIGS. 2 and 3). This shaft core 45 includes a cylindrical current collector portion 45*b* made of metal (for example, aluminum) and a cylindrical resin portion 45*f* made of resin (for example, polypropylene). More particularly, a rear end 45*c* in the axial direction of the current collecting portion 45*b* is pressed into a distal end 45*g* in the axial direction of the resin portion 45*f* to unite the current collecting portion 45*b* and the resin portion 45*f*, thereby forming the shaft core 45 (see FIG. 3). Portion of the shaft core 45 protruding from the wound electrode assembly 40 toward the distal end in the axial direction (upwards in FIG. 1) will be referred to as a protruding portion 45*t*. In Example 1, the protruding portion 45*t* is formed by the current collecting portion 45*b* (see FIGS. 1 to 3).

Figure 7:
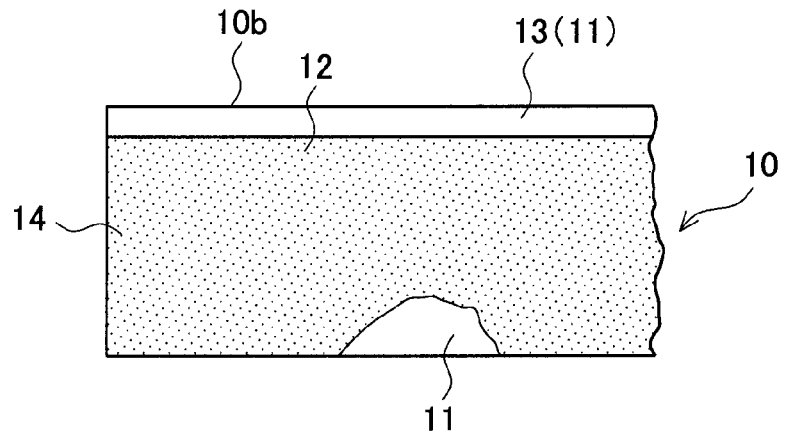
FIG. 7 is a view showing a first electrode plate of Example 1.

As shown in FIG. 7, the first electrode plate 10 has a first active material-coated portion 14 extending along one side 10*b* in the longitudinal direction (left to right direction in FIG. 7) in which the first current collector foil 11 extends, including the first current collector foil 11 and a first mixture layer 12, and a first active material-uncoated portion 13 formed only by the first current collector foil 11 and not including the first mixture layer 12, adjacent this first active material-coated portion 14 and extending along one side 10*b* in the longitudinal direction.

For the first current collector foil 11, for example, an aluminum foil may be used. The first mixture layer 12 is formed by a first active material, binder, and the like. For the first active material, for example, lithium nickel oxide may be used.

Figure 8:
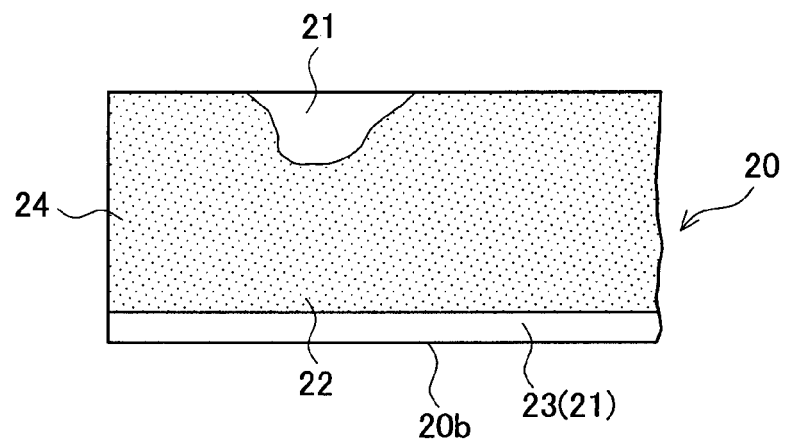
FIG. 8 is a view showing a second electrode plate of Example 1.

As shown in FIG. 8, the second electrode plate 20 has a second active material-coated portion 24 extending along one side 20*b* in the longitudinal direction (left to right direction in FIG. 8) in which the second current collector foil 21 extends, including the second current collector foil 21 and a second mixture layer 22, and a second active material-uncoated portion 23 formed only by the second current collector foil 21 and not including the second mixture layer 22, adjacent this second active material-coated portion 24 and extending along one side 20*b* in the longitudinal direction.

For the second current collector foil 21, for example, a copper foil may be used. The second mixture layer 22 is formed by a second active material, binder, and the like. For the second active material, for example, natural graphite may be used.

The portion forming a distal end (upper end in FIG. 1) of the wound electrode assembly 40 in the axial direction (in which the axis line AX extends, up and down direction in FIG. 1) where only the first active material-uncoated portion 13 of the first electrode plate 10 is wound will be referred to as a first wound portion 44. The portion forming a rear end (lower end in FIG. 1) in the axial direction of the wound electrode assembly 40 where only the second active material-uncoated portion 23 of the second electrode plate 20 is wound will be referred to as a second wound portion 46. The portion located between the first wound portion 44 and the second wound portion 46 where the first electrode plate 10 (first active material-coated portion 14), the second electrode plate 20 (second active material-coated portion 24), and separators 30 are wound will be referred to as a power generating portion 42.

The battery case 60 is a cylindrical battery case, including a metal case body 61 in a cylindrical shape with a bottom, and a disc-like metal lid member 62 (see FIG. 1). The lid member 62 is disposed such as to close the opening 61*j* of the case body 61, and fastened to the case body 61 by crimping (caulking) an opening portion 61*h* forming the opening 61*j*. Between the lid member 62 and the opening portion 61*h* is interposed an annular gasket 69 made of an electrically insulating resin. Thereby, the case body 61 accommodating the wound electrode assembly 40 and the lid member 62 are united, while electrical insulation is provided between the case body 61 and the lid member 62, to form the battery case 60.

The lid member 62 has a cylindrical insertion hole 62*b* in which the protruding portion 45*t* of the shaft core 45 is inserted (see FIG. 1). In the battery 1 of Example 1, the protruding portion 45*t* of the shaft core 45 (part of the current collector portion 45*b*) inserted in the insertion hole 62*b* of the lid member 62 is welded to the lid member 62. By thus welding together the protruding portion 45*t* of the shaft core 45 and the lid member 62 to electrically connect them, the electrical resistance between the current collector portion 45*b* of the shaft core 45 and the lid member 62 can be reduced. In FIG. 1, portions where the lid member 62 and the protruding portion 45*t* of the shaft core 45 are welded together are denoted as welded portions W (blacked-out portions in FIG. 1).

As will be described later, the first wound portion 44 (first electrode plate 10) is welded to the current collector portion 45*b* of the shaft core 45 (current collector joint portion 45*d*) to electrically connect them. Therefore, in the battery 1 of Example 1, the lid member 62 (including the safety vent 63) is electrically connected to the first wound portion 44 (first electrode plate 10) via the current collector portion 45*b* of the shaft core 45 to form a first external terminal (external positive terminal).

The second wound portion 46 (second active material-uncoated portion 23) is welded to a metal second current collector member 72 which has a generally disc-like shape at an end face 46*b* thereof (see FIG. 1). The second current collector member 72 is further welded to the bottom 61*b* of the case body 61. Thus, in the battery 1 of Example 1, the bottom 61*b* of the case body 61 is electrically connected to the second wound portion 46 (second electrode plate 20) via the second current collector member 72 to form a second external terminal (external negative terminal).

In the outer face at the center of the lid member 62 is formed a circular recess 62*c* dented toward the rear end side in the axial direction (see FIG. 1). The generally disc-like safety vent 63 is welded to the surface of this recess 62*c*. This safety vent 63 closes the distal end opening 45*k* of the shaft core 45 (protruding portion 45*t*). This safety vent 63 is formed such as to open by breaking open itself when internal pressure of the battery 1 (pressure inside the battery case 60) builds up and reaches a predetermined vent-opening pressure. The safety vent 63 opens to discharge gas inside the battery 1 (battery case 60) to outside, thus preventing excessive buildup of internal pressure of the battery 1 (pressure inside the battery case 60).

The battery 1 of Example 1 will now be described in detail.

The shaft core 45 of Example 1 has the cylindrical current collector portion 45*b* made of metal (aluminum) as described above. This current collector portion 45*b* includes a flat-shaped current collector joint portion 45*d* (see FIGS. 2 and 3). This current collector joint portion 45*d* is formed in a flat shape to part of a cylindrical metal pipe (portion corresponding to the current collector joint portion 45*d*) by, for example, press-forming.

Figure 4:
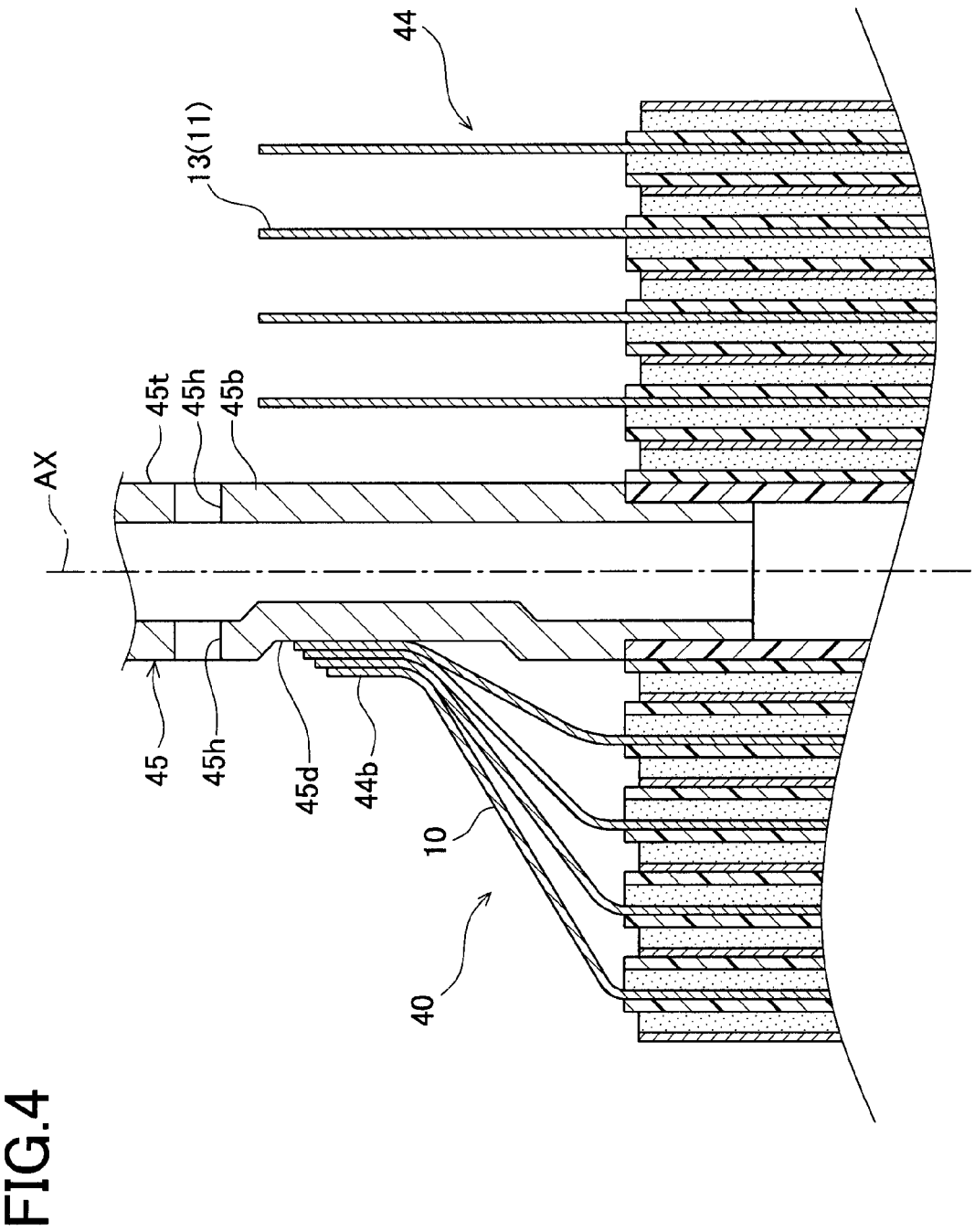
FIG. 4 is an enlarged view of a part B in FIG. 1.
Figure 5:
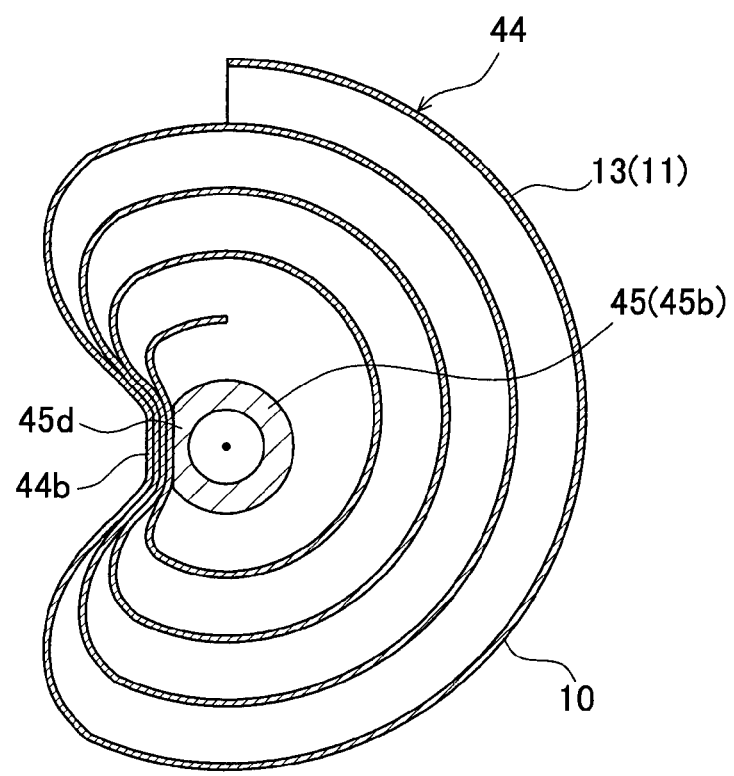
FIG. 5 is a cross-sectional view of a wound electrode assembly wound around the shaft core.

Furthermore, as shown in FIGS. 4 and 5, in the battery 1 of Example 1, part of the first wound portion 44 is joined to the current collector joint portion 45*d* of the current collector portion 45*b*. More particularly, portions of the first wound portion 44 (which will be referred to as wound welded portions 44*b*) located on the radially outer side of the shaft core 45 relative to the current collector joint portion 45*d* (left side of the current collector joint portion 45*d* in FIGS. 4 and 5) are overlapped and welded to the current collector joint portion 45*d* (by ultrasonic welding in Example 1). In other words, portions of the first wound portion 44 located on the radially outer side of the shaft core 45 relative to the current collector joint portion 45*d* are welded to the current collector joint portion 45*d* in an overlapped state. FIG. 4 is an enlarged view of a part B of FIG. 1. FIG. 5 is a cross-sectional view of the wound electrode assembly 40 wound around the shaft core 45, and corresponds to a cross section as viewed in the direction of arrows C-C in FIG. 1 (cross section of the battery 1 cut along a line C-C in FIG. 1).

Welding the first electrode plate 10 (more particularly, first wound portion 44) to the current collector portion 45*b* (current collector joint portion 45*d*) directly and not via a lead wire in this way can reduce electrical resistance between the first electrode plate 10 and the current collector portion 45*b*.

Furthermore, in the battery 1 of Example 1, portions of the first wound portion 44 located on the radially outer side of the shaft core 45 relative to the current collector joint portion 45*d* (wound welded portions 44*b*) are overlapped, so that the current collecting path between the first electrode plate 10 and the current collector portion 45*b* is made short and at the same time increased (by the winding number of the first wound portion 44 which is fifty). Thereby, the electrical resistance between the first electrode plate 10 and the current collector portion 45*b* can be reduced further.

Although the first wound portion 44 is shown with a reduced number of turns (reduced to 5 turns) in FIGS. 4 and 5, the first wound portion 44 actually has fifty turns. Therefore, while only four wound welded portions 44*b* are shown in FIGS. 4 and 5, there are actually fifty wound welded portions 44*b*. Namely, in the battery 1 of Example 1, fifty wound welded portions 44*b* (portions of the first wound portion 44 located on the radially outer side of the shaft core 45 relative to the current collector joint portion 45*d*) are overlapped and welded to the current collector joint portion 45*d*. In other words, fifty wound welded portions 44*b* are welded to the current collector joint portion 45*d* in an overlapped state.

Also, the battery 1 of Example 1, as compared to conventional batteries (for example the battery of Patent Document 1), does not use a lead wire for the electrical connection between the first electrode plate 10 and the current collector portion 45*b*, so that the number of components can be reduced accordingly. Moreover, since the shaft core 45 includes the current collector portion 45*b* (the current collector portion 45*b* being part of the shaft core 45) in the battery 1 of Example 1, the number of components can be reduced as compared to conventional batteries (for example the battery of Patent Document 1) in which the shaft core and the current collector portion (current collector plate) are separate components.

Furthermore, in the battery 1 of Example 1, the current collector joint portion 45*d* has a flat shape as described above. Therefore, when the wound welded portions 44*b* are overlapped and welded to the current collector joint portion 45*d*, they (wound welded portions 44*b* and current collector joint portion 45*d*) can be appropriately welded (joined) together. More specifically, when the wound welded portions 44*b* are welded to the current collector joint portion 45*d* by ultrasonic welding as will be described later, they can be pressed together appropriately (sufficiently), as the flat-shaped current collector joint portion 45*d* can make better pressure contact with the wound welded portions 44*b* than a circular current collector joint portion, whereby they can be welded together appropriately (sufficiently).

Next, the mechanism in the battery 1 of Example 1 for discharging gas inside the battery 1 to the outside will be described in detail.

As shown in FIGS. 2 and 3, the shaft core 45 of Example 1 is formed, at the rear end in the axial direction of itself (lower end in FIGS. 2 and 3), with two cut-outs 45*m* formed by cutting off part of the wall that forms the resin portion 45*f* in a shape extending from the rear end in the axial direction of itself (lower end in FIGS. 2 and 3) toward the distal end side in the axial direction (upper side in FIGS. 2 and 3).

Figure 6:
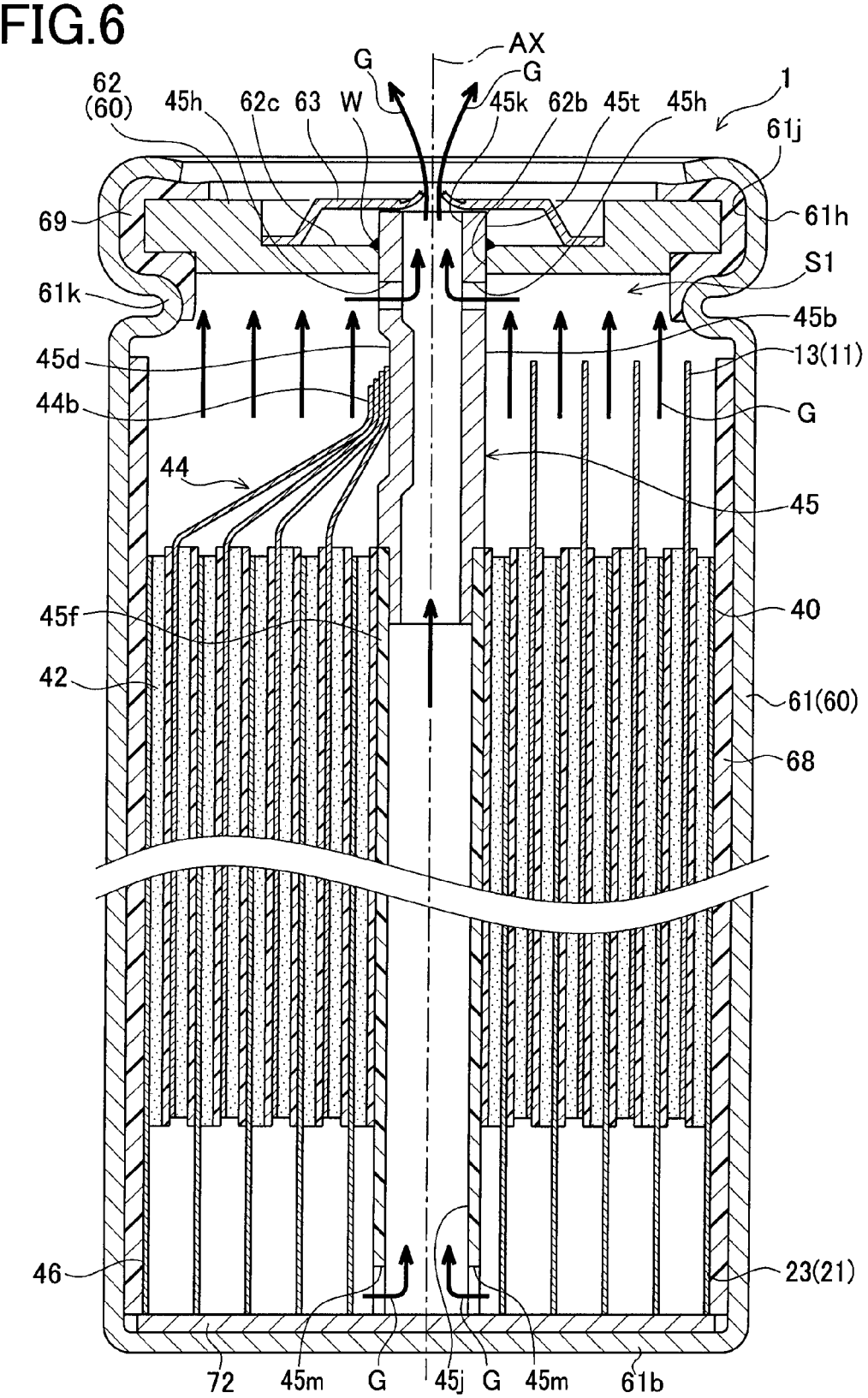
FIG. 6 is a view showing a gas discharging state of the battery of Example 1 when a safety vent is opened.

Thereby, as indicated by arrows in a lower part of FIG. 6, gas G released from the rear end in the axial direction (lower end in FIG. 6) of the power generating portion 42 of the wound electrode assembly 40 to the outside of the power generating portion 42 (gaps in the second wound portion 46) can be introduced into the bore 45*j* of the shaft core 45 through the cut-outs 45*m* in the shaft core 45. Accordingly, when the internal pressure of the battery 1 (pressure inside the battery case 60) builds up and the safety vent 63 opens (breaks open), the gas G released from the rear end in the axial direction of the power generating portion 42 of the wound electrode assembly 40 to the outside of the power generating portion 42 (gaps in the second wound portion 46) is discharged through the bore 45*j* of the shaft core 45 from the open safety vent 63 to the outside of the battery 1 as indicated by arrows in FIG. 6.

In conventional batteries (for example the battery of Patent Document 1), gas G released from the distal end (upper end) in the axial direction of the wound electrode assembly to the outside thereof could not be introduced into the bore of the shaft core, nor could it be discharged from the open safety vent to the outside of the battery. For this reason, there was a risk of an excessive build-up of pressure even after the safety vent has opened because of the inability to lower the pressure in the space at the distal end (upper end) in the axial direction of the wound electrode assembly inside the battery.

In this respect, in the battery 1 of Example 1, as shown in FIGS. 1 to 3, the protruding portion 45t of the shaft core 45 has through holes 45h extending through the wall forming the protruding portion 45t at a location further on the rear end side in the axial direction than the lid member 62 (lower and closer to the wound electrode assembly 40 in FIG. 1) (and further on the distal end side in the axial direction than the current collector joint portion 45d). This through hole 45h is formed at four circumferentially regularly spaced locations in the protruding portion 45t.

Thereby, in the battery 1 of Example 1, as indicated by arrows in an upper part of FIG. 6, gas G released from the distal end in the axial direction (upper end in FIG. 6) of the wound electrode assembly 40 to the outside thereof can be introduced into the bore 45j of the shaft core 45 through the through holes 45h of the protruding portion 45t. Accordingly, when the internal pressure of the battery 1 (pressure inside the battery case 60) builds up and the safety vent 63 opens (breaks open), the gas G released from the distal end in the axial direction of the wound electrode assembly 40 to the outside thereof can be discharged through the bore 45j of the shaft core 45 from the open safety vent 63 to the outside of the battery 1 as indicated by arrows in FIG. 6. Thereby, when the safety vent 63 opens, the pressure in the space S1 at the distal end in the axial direction of the wound electrode assembly 40 inside the battery 1 can also be reduced, whereby any excessive pressure build-up can be prevented.

Next, the method for manufacturing the battery 1 according to Example 1 will be described below.

First, the first electrode plate 10 having the first mixture layer 12 formed on the surface of a strip-shaped first current collector foil 11 is prepared, as shown in FIG. 7. This first electrode plate 10 includes a first active material-coated portion 14 extending along one side 10b in the longitudinal direction (left to right direction in FIG. 7) in which the first current collector foil 11 extends, including the first current collector foil 11 and the first mixture layer 12, and a first active material-uncoated portion 13 formed only by the first current collector foil 11 and not including the first mixture layer 12, adjacent the first active material-coated portion 14 and extending along one side 10b in the longitudinal direction.

Further, the second electrode plate 20 having the second mixture layer 22 formed on the surface of a strip-shaped second current collector foil 21 is prepared, as shown in FIG. 8. This second electrode plate 20 includes a second active material-coated portion 24 extending along one side 20b in the longitudinal direction (left to right direction in FIG. 8) in which the second current collector foil 21 extends, including the second current collector foil 21 and the second mixture layer 22, and a second active material-uncoated portion 23 formed only by the second current collector foil 21 and not including the second mixture layer 22, adjacent the second active material-coated portion 24 and extending along one side 20b in the longitudinal direction.

Figure 9:
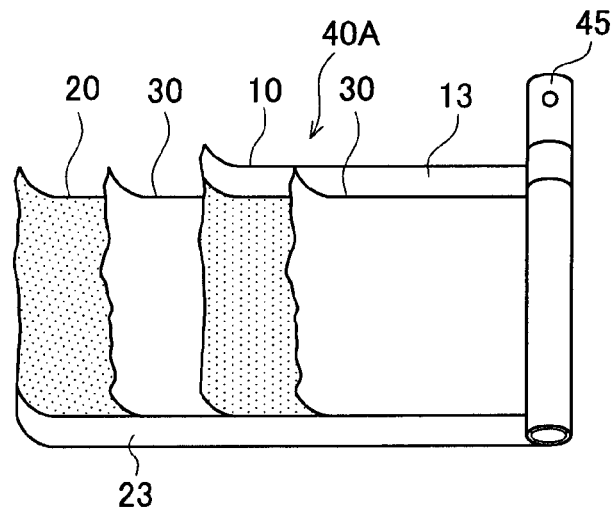
FIG. 9 is an explanatory view of a winding step of Example 1.

Next, in a lamination step, the second electrode plate 20, the separator 30, the first electrode plate 10, and the separator 30 are laid over one another in this order (see FIG. 9). More specifically, they are laid over one another such that the first active material-uncoated portion 13 of the first electrode plate 10 and the second active material-uncoated portion 23 of the second electrode plate 20 are located oppositely from each other in the width direction (up and down direction in FIG. 9), and such that the first active material-uncoated portion 13 does not overlap the separator 30 and the second electrode plate 20 and that the second active material-uncoated portion 23 does not overlap the separator 30 and the first electrode plate 10.

Next, the process goes to a winding step, where, as shown in FIG. 9, the laminated assembly 40A of the second electrode plate 20, the first electrode plate 10, and the separator 30 laid over one another is wound around the cylindrical shaft core 45. The cylindrical wound electrode assembly 40 can thus be formed (see FIG. 10). In Example 1, the laminated assembly 40A was wound 50 times around the shaft core 45.

Figure 10:
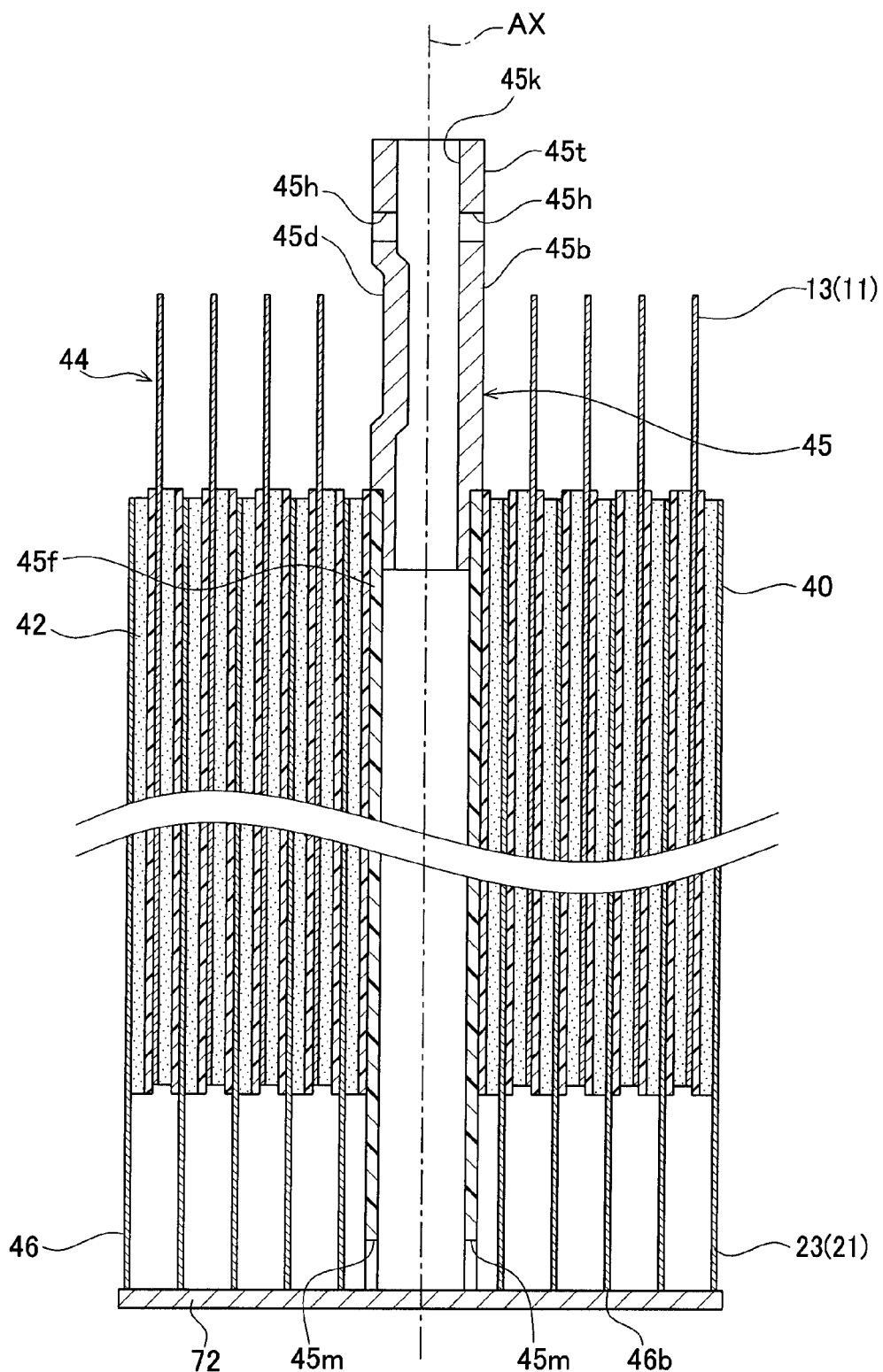
FIG. 10 is a longitudinal cross-sectional view of the wound electrode body wound around the shaft core.

After that, the second current collector member 72 was welded to the second wound portion 46 (see FIG. 10). More specifically, the second wound portion 46 was laser-welded to the second current collector member 72 by irradiating a laser beam to a surface of the second current collector member 72, with the end face 46b of the second wound portion 46 being abutted to the second current collector member 72.

Figure 11:
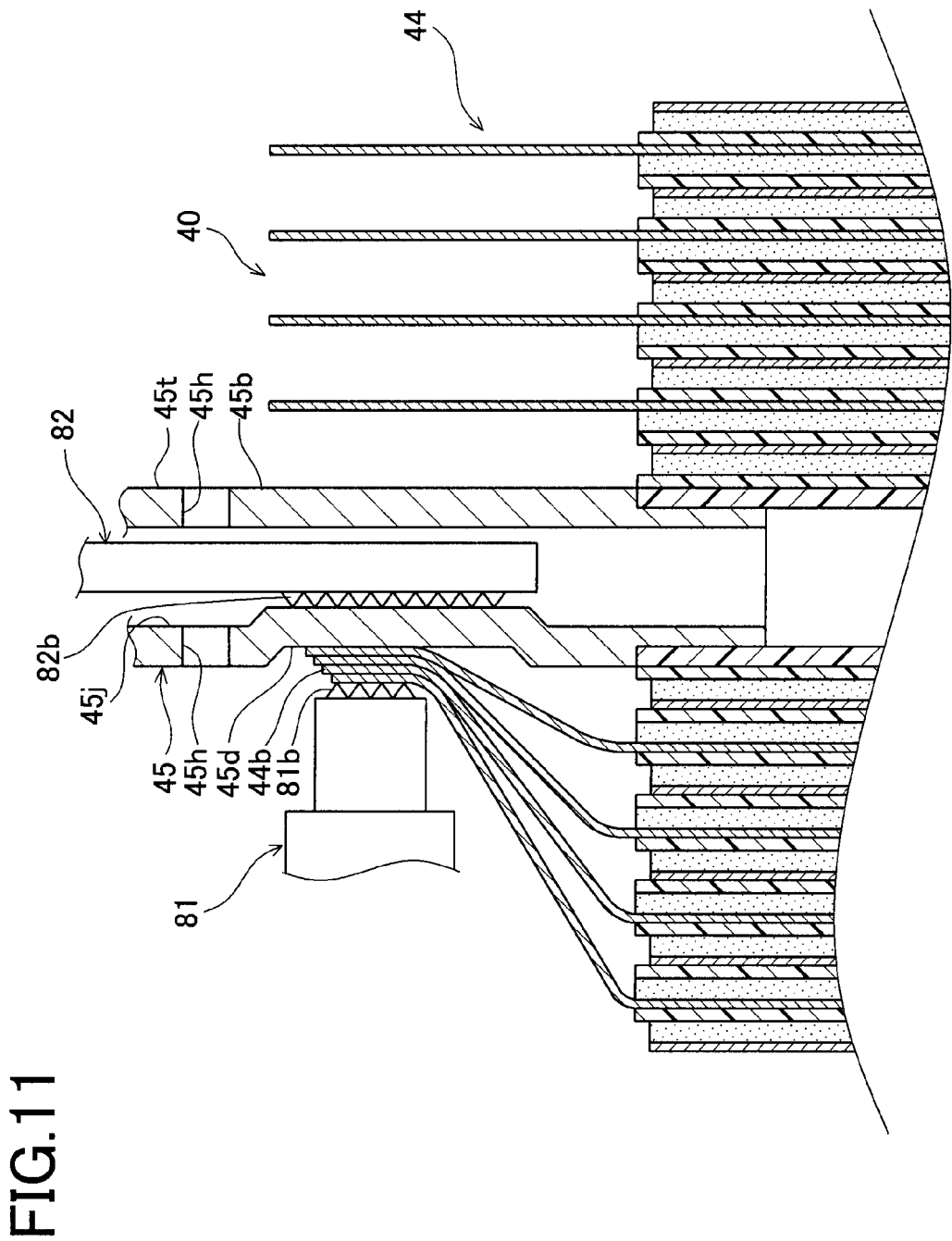
FIG. 11 is an explanatory view of a first welding step of Example 1.

Next, the process goes to a first welding step, where the wound welded portions 44b were welded to the current collector joint portion 45d by ultrasonic welding. More specifically, as shown in FIG. 11, an anvil 82 is inserted into the bore 45j of the shaft core 45 (current collector portion 45b) to abut a pressing portion 82b of the anvil 82 against an inner face (flat surface) of the current collector joint portion 45d of the shaft core 45. Further, the wound welded portions 44b of the first wound portion 44 (portions located on the radially outer side of the shaft core 45 relative to the current collector joint portion 45d, see FIG. 5) are overlapped onto the radially inner side by means of a pressing portion 81b of an ultrasonic horn 81, and these overlapped wound welded portions 44b are pressed against an outer face (flat surface) of the current collector joint portion 45d of the shaft core 45. In this state, ultrasonic vibration was generated in the pressing portion 81b of the ultrasonic horn 81 to weld the wound welded portions 44b to the current collector joint portion 45d.

Welding the first electrode plate 10 (more particularly, first wound portion 44) to the current collector portion 45b (current collector joint portion 45d) directly and not via a lead wire in this way can reduce electrical resistance between the first electrode plate 10 and the current collector portion 45b.

Furthermore, in the first welding step, portions of the first wound portion 44 located on the radially outer side of the shaft core 45 relative to the current collector joint portion 45d (wound welded portion 44b) are overlapped, so that the current collecting path between the first electrode plate 10 and the current collector portion 45b is made short and at the same time increased (by the winding number of the first wound portion 44 which is fifty). Thereby, the electrical resistance between the first electrode plate 10 and the current collector portion 45b can be reduced further.

Furthermore, in Example 1, the current collector joint portion 45d has a flat shape as described above. Therefore, in the first welding step, the wound welded portions 44b and the current collector joint portion 45d can be appropriately welded (joined) together. More specifically, when the wound welded portions 44b are ultrasonically welded to the current collector joint portion 45d using the ultrasonic horn 81 and the anvil 82 as described above, they can be pressed together appropriately (sufficiently), as the flat-shaped current collector joint portion 45d can make better pressure contact with the wound welded portions 44b than a circular current collector joint portion by means of the pressing portion 82b of the anvil 82 and the pressing portion 81b of the ultrasonic horn 81, whereby they can be welded together appropriately (sufficiently).

Figure 12:
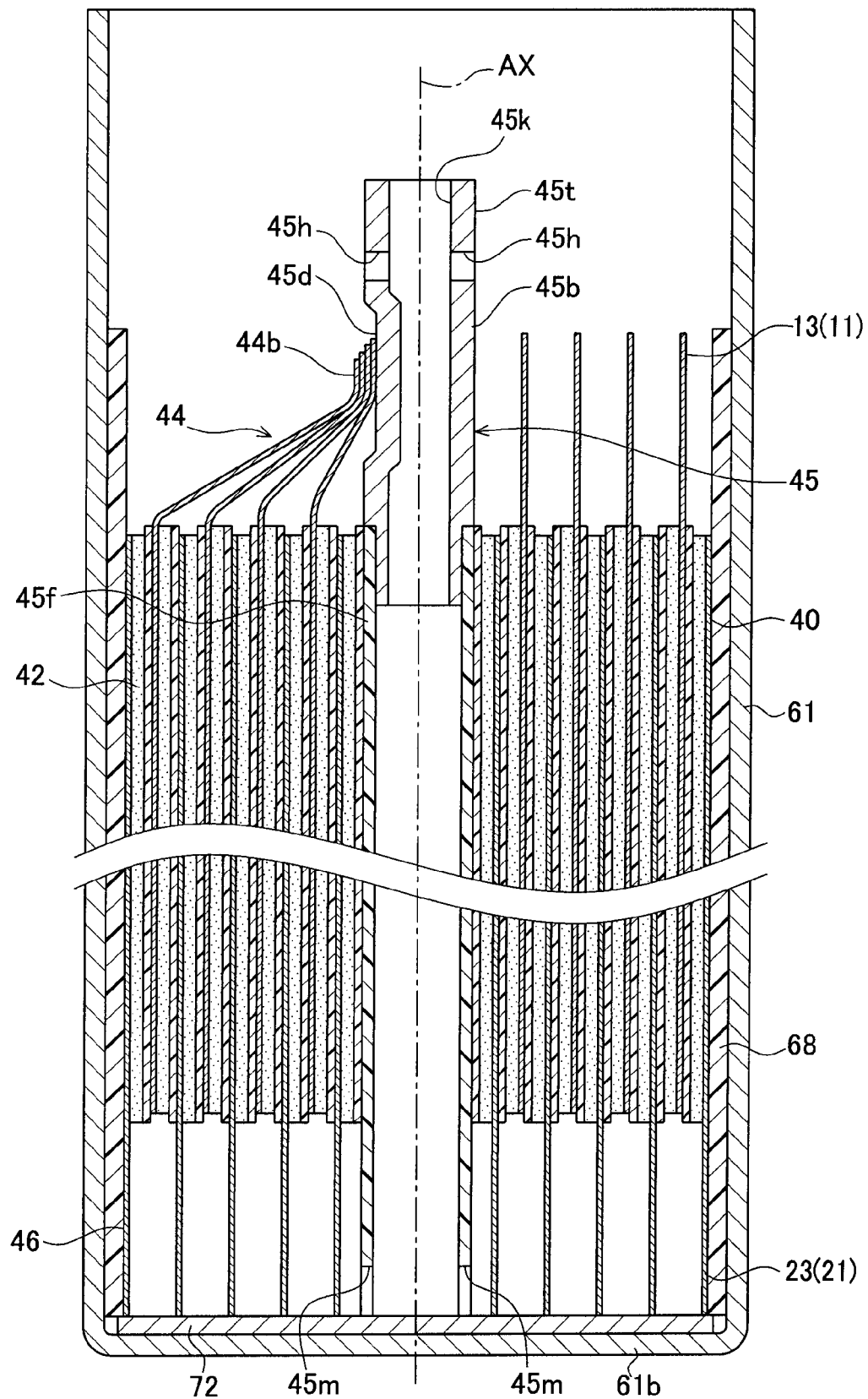
FIG. 12 is an explanatory view of an encasing step of Example 1.

Next, the process goes to an encasing step, where, as shown in FIG. 12, the wound electrode assembly 40 wound around the outer circumference of the shaft core 45 is accommodated inside the case body 61 together with the shaft core 45. In this step, the second current collector member 72 welded to the second wound portion 46 makes contact with the bottom 61b of the case body 61. The insulating sheet 68 is wrapped around the outer circumference of the wound electrode assembly 40 before the wound electrode assembly 40 is encased into the case body 61.

After that, the second current collector member 72 is welded to the bottom 61b of the case body 61. More specifically, the second current collector member 72 was laser-welded to the bottom 61b of the case body 61 by irradiating a laser beam to an outer surface of the bottom 61b of the case body 61. Thus the bottom 61b of the case body 61 is electrically connected to the second wound portion 46 (second electrode plate 20) via the second current collector member 72 to form the second external terminal.

Figure 13:
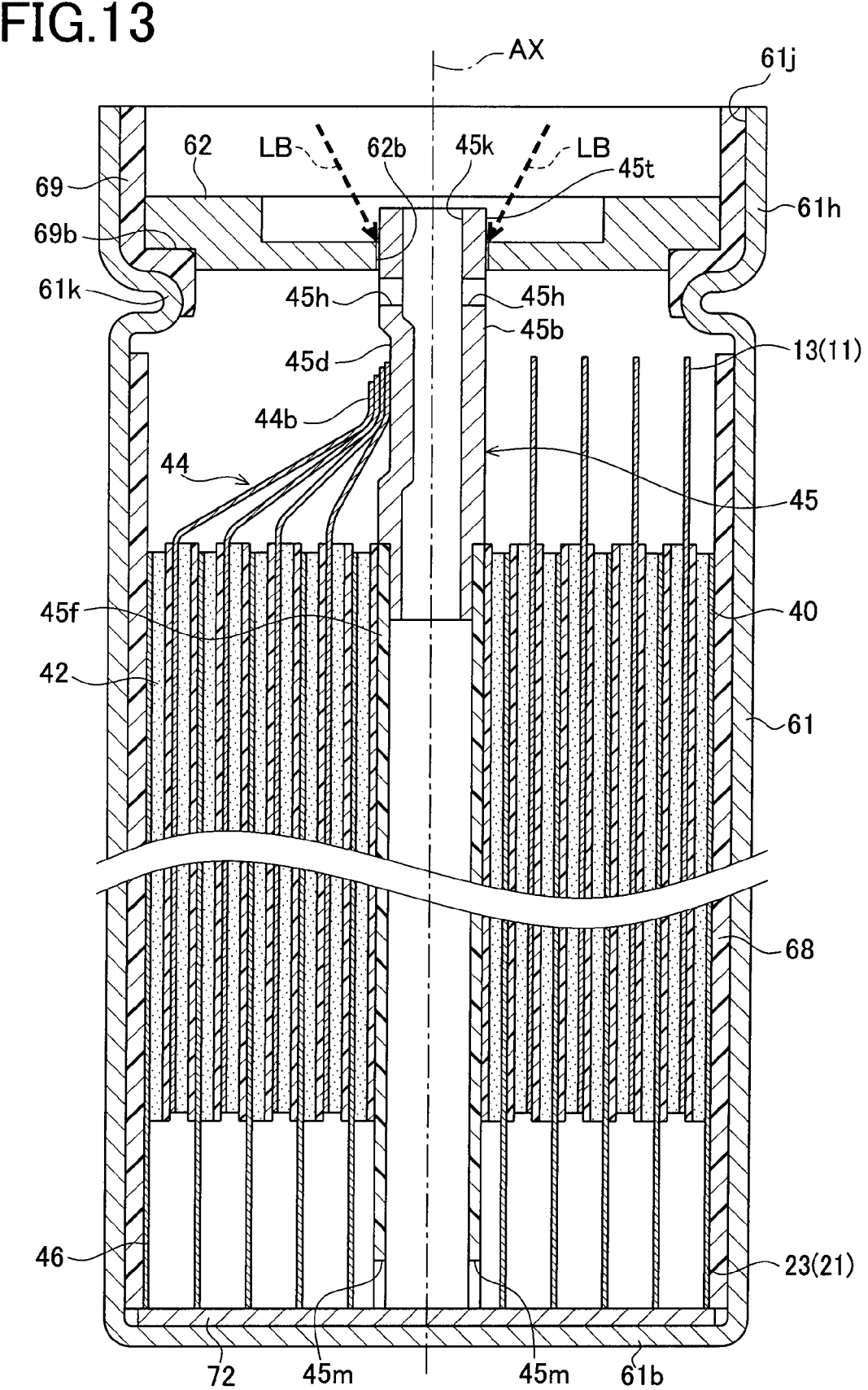
FIG. 13 is an explanatory view of a second welding step of Example 1.

Next, as shown in FIG. 13, part of the distal end in the axial direction (upper side in FIG. 13) of the case body 61 is deformed radially inwards (toward the axis line AX) all around the case body 61 to form an annular step 61k. After that, the annular gasket 69 is disposed inside the opening portion 61h of the case body 61. The gasket 69 is positioned relative to the case body 61 by being placed onto the annular step 61k.

Next, the process goes to an installation step, where the lid member 62 is arranged inside the opening 61j (more particularly, inside the gasket 69) of the case body 61, with the protruding portion 45t of the shaft core 45 being inserted into the insertion hole 62b of the lid member 62. The lid member 62 is positioned relative to the case body 61 by being placed onto a step 69b of the gasket 69.

Next, the process goes to a second welding step, where the protruding portion 45t of the shaft core 45 that has been inserted into the insertion hole 62b of the lid member 62 is welded to the lid member 62. More specifically, as shown in FIG. 13, the lid member 62 is laser-welded to the shaft core 45 (protruding portion 45t) by irradiating a laser beam LB all around the protruding portion 45t from outside the lid member 62. By thus welding together the protruding portion 45t of the shaft core 45 and the lid member 62 (first external terminal) to electrically connect them, the electrical resistance between these members can be reduced. Welding the shaft core 45 (protruding portion 45t) all around to the lid member 62 hermetically seals the insertion hole 62b in the lid member 62.

Next, the opening portion 61h forming the opening 61j of the case body 61 is crimped to fasten the lid member 62 together with the gasket 69 to the case body 61 (see FIG. 1). Thereby, the case body 61 and the lid member 62 are united, while electrical insulation is provided between the case body 61 and the lid member 62 by the gasket 69, to form the battery case 60. After that, liquid electrolyte is poured into the case body 61 through the distal end opening 45k of the shaft core 45. After that, the safety vent 63 is welded all around on the surface of the recess 62c in the lid member 62. This closes the distal end opening 45k of the shaft core 45, and the sealed battery 1 is complete.

Example 2

Next, a battery 100 according to Example 2 will be described. The battery 100 of Example 2 is different from the battery 1 of Example 1 in the shape of the current collector portion of the shaft core, and is otherwise generally the same as Example 1. Therefore, the difference from Example 1 will be mainly described here and description of similar features will be omitted or simplified.

Figure 14:
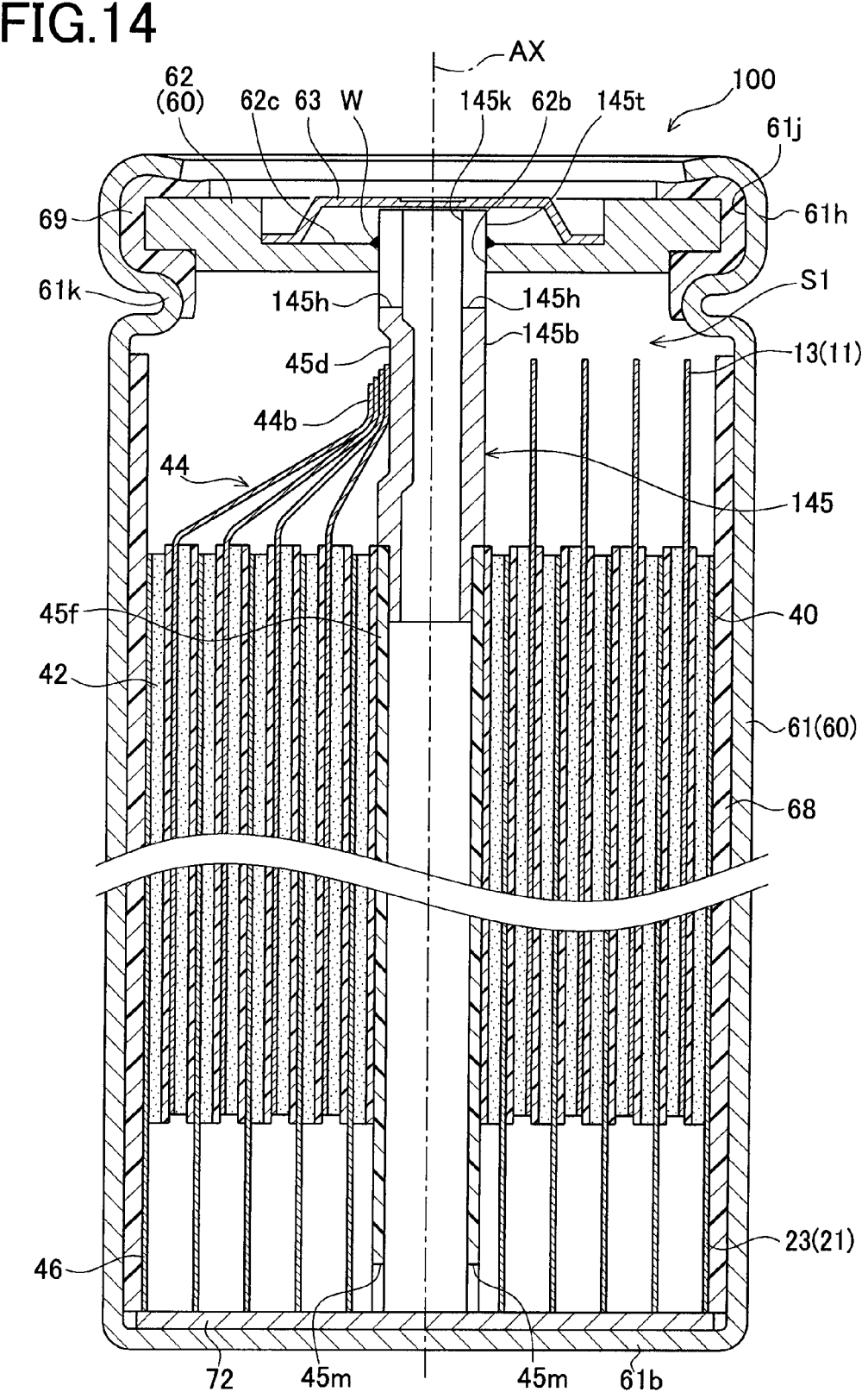
FIG. 14 is a longitudinal cross-sectional view of a battery of Example 2.

FIG. 14 is a longitudinal cross-sectional view (cross-sectional view cut along the axis line AX) of the battery 100 according to Example 2. The battery 100 of Example 2 includes a shaft core 145 instead of the shaft core 45 of Example 1. The wound electrode assembly 40 is actually a wound electrode assembly with 50 turns, but FIG. 14 and others show the wound electrode assembly 40 with a reduced number of turns (reduced to 5 turns).

Figure 15:
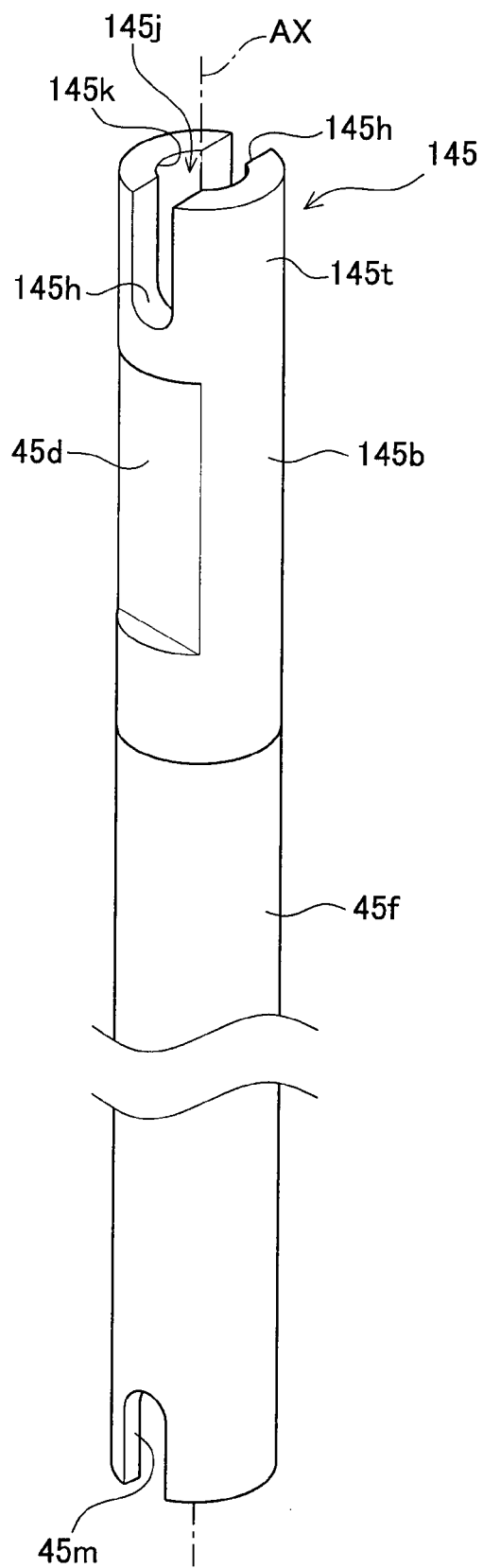
FIG. 15 is a perspective view of a shaft core of Example 2.

The shaft core 145 includes a cylindrical current collector portion 145b made of metal (for example, aluminum) and a cylindrical resin portion 45f made of resin (for example, polypropylene), as shown in FIG. 15. Of these, the current collecting portion 145b (more particularly, protruding portion 145t), unlike the current collecting portion 45b (protruding portion 45t) of Example 1, includes cut-outs 145h formed by cutting off part of the wall that forms the protruding portion 145t from the distal end of itself (distal end in the axial direction, or upper end in FIGS. 14 and 15) toward a position further on the rear end side in the axial direction than the lid member 62 (closer to the wound electrode assembly 40, lower in FIG. 14). In other words, the protruding portion 145t of Example 2 is formed with the cut-outs 145h instead of the through holes 45h of Example 1. The cut-out 145h is formed at two radially opposite positions in the protruding portion 145t.

Figure 16:
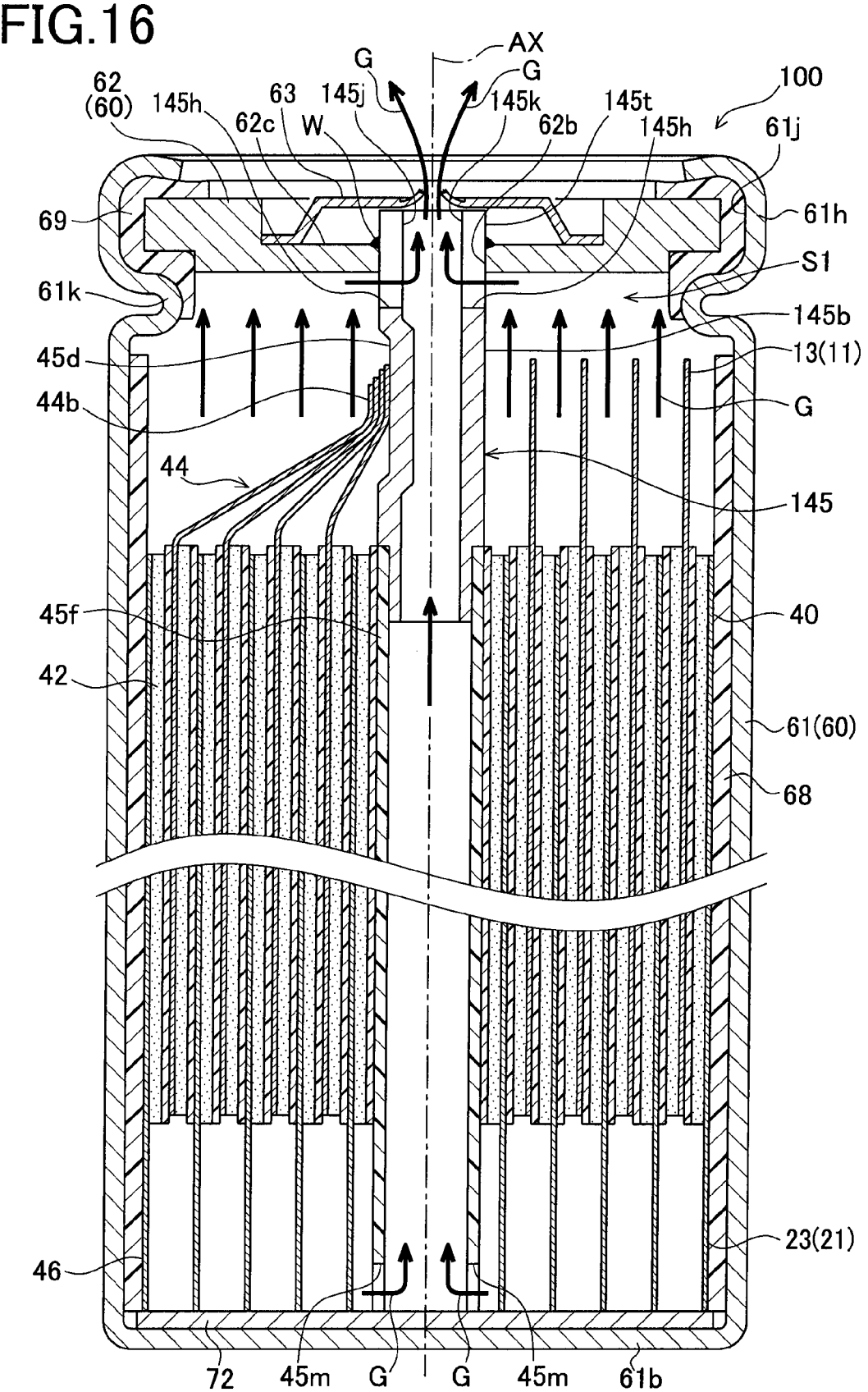
FIG. 16 is a view showing a gas discharging state of the battery of Example 2 when a safety vent is opened.

Thereby, in the battery 100 of Example 2, as indicated by arrows in an upper part of FIG. 16, gas G released from the distal end in the axial direction (upper end in FIG. 16) of the wound electrode assembly 40 to the outside thereof can be introduced into the bore 145j of the shaft core 145 through the cut-outs 145h of the protruding portion 145t. Accordingly, when the internal pressure of the battery 100 (pressure inside the battery case 60) builds up and the safety vent 63 opens (breaks open), the gas G released from the distal end in the axial direction of the wound electrode assembly 40 to the outside thereof is discharged through the bore 145j of the shaft core 145 from the open safety vent 63 to the outside of the battery 100 as indicated by arrows in FIG. 16. Thereby, when the safety vent 63 opens, the pressure in the space S1 at the distal end in the axial direction of the wound electrode assembly 40 inside the battery 100 can also be reduced, whereby any excessive pressure build-up can be prevented.

Also, as indicated by arrows in a lower part of FIG. 16, gas G released from the rear end in the axial direction (lower end in FIG. 16) of the power generating portion 42 of the wound electrode assembly 40 to the outside of the power generating portion 42 (gaps in the second wound portion 46) can be introduced into the bore 145j of the shaft core 145 through the cut-outs 45m of the shaft core 145. Accordingly, when the internal pressure of the battery 100 (pressure inside the battery case 60) builds up and the safety vent 63 opens (breaks open), the gas G released from the rear end in the axial direction of the power generating portion 42 of the wound electrode assembly 40 to the outside of the power generating portion 42 (gaps in the second wound portion 46) can also be discharged through the bore 145j of the shaft core 145 from the open safety vent 63 to the outside of the battery 100 as indicated by arrows in FIG. 16.

In the battery 100 of Example 2, too, as with the battery 1 of Example 1, portions of the first wound portion 44 (wound welded portions 44b) located on the radially outer side of the shaft core 145 relative to the current collector joint portion 45d (left side of the current collector joint portion 45d in FIG. 14) are overlapped and welded (ultrasonically welded in Example 2, too) to the current collector joint portion 45d. In other words, portions of the first wound portion 44 located on the radially outer side of the shaft core 145 relative to the current collector joint portion 45d are welded to the current collector joint portion 45d in an overlapped state.

Welding the first electrode plate 10 (more particularly, first wound portion 44) to the current collector portion 145b (current collector joint portion 45d) directly and not via a lead wire in this way can reduce electrical resistance between the first electrode plate 10 and the current collector portion 145b.

Furthermore, portions of the first wound portion 44 located on the radially outer side of the shaft core 145 relative to the current collector joint portion 45d (wound welded portion 44b) are overlapped, so that the current collecting path between the first electrode plate 10 and the current collector portion 145b is made short and at the same time increased (by the winding number of the first wound portion 44 which is fifty). Thereby, the electrical resistance between the first electrode plate 10 and the current collector portion 145b can be reduced further.

Also, the battery 100 of Example 2, as compared to conventional batteries (for example the battery of Patent Document 1), does not use a lead wire for the electrical connection between the first electrode plate 10 and the current collector portion 145b, so that the number of components can be reduced accordingly. Moreover, in the battery 100 of Example 2, too, since the shaft core 145 includes the current collector portion 145b (the current collector portion 145b being part of the shaft core 145), the number of components can be reduced as compared to conventional batteries (for example the battery of Patent Document 1) in which the shaft core and the current collector portion (current collector plate) are separate components.

Furthermore, in the battery 100 of Example 2, too, the current collector joint portion 45d has a flat shape as described above. Therefore, when the wound welded portions 44b are overlapped and welded to the current collector joint portion 45d, they (wound welded portions 44b and current collector joint portion 45d) can be appropriately welded (joined) together. More specifically, when the wound welded portions 44b are welded to the current collector joint portion 45d by ultrasonic welding, they can be pressed together appropriately (sufficiently), as the flat-shaped current collector joint portion 45d can make better pressure contact with the wound welded portions 44b than a circular current collector joint portion by means of the pressing portion 82b of the anvil 82 and the pressing portion 81b of the ultrasonic horn 81, whereby they can be welded together appropriately (sufficiently).

The present invention is explained as above in Examples 1 and 2 but is not limited thereto. The present invention may be embodiment in other specific forms without departing from the essential characteristics thereof

DESCRIPTION OF THE REFERENCE SIGNS 1, 100 Battery
10 First electrode plate
13 First active material-uncoated portion
20 Second electrode plate
23 Second active material-uncoated portion
30 Separator
40 Wound electrode assembly
42 Power generating portion
44 First wound portion
45, 145 Shaft core
45b, 145b Current collecting portion
45d Current collector joint portion
45h Through hole
45j, 145j Bore
45t, 145t Protruding portion
46 Second wound portion
61 Case body
62 Lid member
62b Insertion hole
63 Safety vent
145h Cut-out

The invention claimed is:

1. A battery including:
a cylindrical shaft core having a bore extending in an axial direction; and
a wound electrode assembly formed by winding a first electrode plate, a second electrode plate, and separators around an outer circumference of the cylindrical shaft core,
the wound electrode assembly including:
 a first wound portion formed by a wound first active material-uncoated portion of the first electrode plate, the first wound portion constituting a distal end of the wound electrode assembly in the axial direction,
 a second wound portion formed by a wound second active material-uncoated portion of the second electrode plate, the second wound portion constituting a rear end of the wound electrode assembly in the axial direction, and
 a power generating portion located between the first wound portion and the second wound portion in the axial direction and formed by the first electrode plate, the second electrode plate, and the separators wound together,
wherein the shaft core includes a metal current collector portion having a current collector joint portion to be joined with the first wound portion or the second wound portion,
wherein portions of the first wound portion or the second wound portion located on a radially outer side of the shaft core relative to the current collector joint portion are overlapped and welded to the current collector joint portion,
wherein the shaft core includes a protruding portion protruding from the wound electrode assembly towards the distal end in the axial direction;
wherein the battery includes:
a cylindrical case body with a bottom for accommodating the wound electrode assembly,
a lid member closing an opening of the case body and having an insertion hole, into which the protruding portion is inserted, and
a safety vent closing a distal end opening of the protruding portion, the safety vent being capable of opening when internal pressure of the battery reaches a predetermined vent-opening pressure to discharge gas introduced into the bore of the shaft core inside the battery through the bore from the safety vent to the outside of the battery,
wherein the protruding portion of the shaft core includes a through hole extending through the wall forming the protruding portion at a position further on the rear end side in the axial direction than the lid member, or, a cut-out formed by cutting off part of the wall forming the protruding portion from a distal end of itself to a position further on the rear end side in the axial direction than the lid member;

wherein the lid member is an external electrode terminal made of metal and exposed to the outside of the battery;

wherein the protruding portion protrudes out of the case body through the insertion hole; and wherein protruding portion is a part of the current collector portion, and the protruding portion is welded to a portion of the lid member, located around the insertion hole.

2. The battery according to claim 1, wherein the current collector joint portion has a flat shape.

\* \* \* \* \*